United States Patent [19]

Bunick et al.

[11] Patent Number: 4,714,620
[45] Date of Patent: Dec. 22, 1987

[54] SOFT, SUGARLESS AERATED CONFECTIONERY COMPOSITION

[75] Inventors: Frank J. Bunick, Budd Lake; Sheryl A. Hutchinson, Lake Hiawatha; Ralph Cifrese, Morristown, all of N.J.

[73] Assignee: Warner-Lambert Company, Morris Plains, N.J.

[21] Appl. No.: 941,257

[22] Filed: Dec. 12, 1986

[51] Int. Cl.$^4$ .............................................. A23G 3/00
[52] U.S. Cl. ..................................... 426/572; 426/660; 426/804
[58] Field of Search ............... 426/572, 660, 804, 548, 426/658, 573

[56] References Cited

U.S. PATENT DOCUMENTS

| | | | |
|---|---|---|---|
| 3,809,756 | 5/1974 | Bush et al. | 426/572 |
| 4,154,867 | 5/1979 | Aldrich et al. | 426/804 |
| 4,323,588 | 4/1982 | Vink et al. | 426/660 |
| 4,582,707 | 4/1986 | Calabro | 426/658 |
| 4,597,981 | 7/1986 | Kastin | 426/804 |

*Primary Examiner*—Jeanette Hunter
*Attorney, Agent, or Firm*—Charles A. Gaglia, Jr.; Gary M. Nath

[57] ABSTRACT

A sugarless, soft chewable aerated nougat-type confection having acceptable cold flow and good mouthfeel comprising a hydrogenated starch hydrolysate together with water soluble and water non-soluble cellulosics and a method for producing same.

37 Claims, No Drawings

4,714,620

SOFT, SUGARLESS AERATED CONFECTIONERY COMPOSITION

BACKGROUND OF THE INVENTION

Nougats are perhaps the most complex and difficult of the generic confectionery bases to prepare. They are aerated confections whose density largely depends on a frappe element and texture on a syrup element along with its subsequent crystallization.

The preparation of soft confections such as nougat, involves the combination of two primary components thereof, namely a high boiling syrup such as corn syrup or the like, and a relatively light textured frappe, generally prepared from gelatin, egg albumen, milk proteins such as casein, and vegetable proteins such as soy protein, and the like. The frappe is generally relatively light, and may, for example, range in density from about 0.3 to about 0.8.

By comparison, the high boiled syrup, or "bob syrup", is relatively viscous and possesses a higher density, and frequently contains a substantial amount of sugar. Conventionally, the final nougat composition is prepared by the addition of the "bob syrup" to the frappe under agitation, to form the basic nougat mixture. Further ingredients such as flavorings, oils, additional sugar and the like may be added thereafter also under agitation. A general discussion of the composition and preparation of nougat confections may be found in B. W. Minifie, CHOCOLATE, COCOA AND CONFECTIONERY: Science and Technology, 2nd Edition, AVI Publishing Co., Inc., Westport, Conn., (1980) at Pages 424–425. Nougat formulations developed around sugar as a base are not directly applicable to the sugarless polyols because of basic differences in the physical/chemical properties of polyols relative to sucrose.

Therefore, the development of sugarless nougat technology based on sugar substitutes (e.g., polyols) will depend on the chemical characteristics of the polyols available, the ability to control the graining of sugar substitutes or simulation of grain with sugarless ingredients as well as the ability of polyols to entrap air during whipping.

A number of sugar substitutes have been developed which can be used in a confectionery composition. Of particular interest are hydrogenated starch hydrolysates which have been used as a sucrose substitute in candy and other sugar containing products and polyhydric alcohols, such as sorbitol.

The polyhydric alcohols and hydrogenated starch hydrolysates are hydroscopic and generally form candies that are unstable at elevated temperatures and high humidity. In particular, soft candies containing hydrogenated starch hydrolysates tend to become sticky and have excessive cold flow when subjected to these conditions. One method used to control this problem is to wrap the candies such that the moisture content will be kept at less than about 1%.

Hydrogenated starch hydrolystes have been used to form a gelled confection. U.S. Pat. No. 4,597,981 discloses a process for preparing a soft candy composition containing from 9% to 82% by weight hydrogenated starch hydrolysate and 82% to 9% by weight of at least one polymer of glucose or maltose, 3% to 16% by weight of gelatin and 6% to 20% water by weight to form a soft, sugar free gelled candy.

Hydrogenated starch hydrolysates have been used to form a nougat-type confection. U.S. Pat. No. 4,323,588 discloses aerated confections such as marshmallow or nougat. The product requires the proper blend of crystallized and dissolved carbohydrates in conjunction with a whipping agent. The confection contains as bulking agent and sweetener a combination of about 20% to about 90% hydrogenated starch hydrolysate and about 5% to about 60% hydrogenated sugar such as isomaltitol and preferably hydrogenated isomaltulose.

The aerated nougat type confections produced above require expensive not readily available ingredients and produce a soft composition suitable for molded products.

It would, therefore, be desirable to develop pleasant tasting, soft, sugarless nougat-type confections prepared with inexpensive readily available ingredients which can be formed into final shape by molding, cut and wrap or extrusion processes.

SUMMARY OF THE INVENTION

A sugarless, soft, chewable aerated nougat-type confection comprising from about 35% to about 89% hydrogenated starch hydrolysates (HSH) has been unexpectedly discovered. This has been achieved by incorporating about 1% to about 10% of water soluble and water non-soluble cellulosics present in a ratio of about 1:3 to about 3:1 into the confection, a whipping agent in an amount of about 0.1% to about 7.5% and water in an amount of about 7% to about 12%. The new sugarless nougat confection is pleasant tasting does not have a gritty or astringent mouthfeel usually associated with cellulosics and can be formed into final product by conventional methods generally utilized for nougats such as molding, cutting to shape and extrusion.

DETAILED DESCRIPTION

It has been found that a sugarless, chewable nougat type confection comprising about 35% to about 89% hydrogenated starch hydrolysate and about 1% to about 10% cellulosics, wherein the cellulosics are a non-water soluble cellulosic and a water soluble cellulosic such that the total amount of cellulosics in the composition is about 1% to about 10% and the ratio of water-soluble to non-water soluble in the total composition is about 1:3 to about 3:1, a whipping agent in an amount of about 0.1% to about 7.5%, and water in an amount of about 7% to about 12%, is produced from an admixture of about 10% to about 35% of a frappe component, a syrup component and about 2% to about 10% of a fat.

In particular, a sugarless chewable aerated confectionary composition has been found which comprises:

(1) form about 10% to about 35% of a frappe component comprising;
    a hydrogenated starch hydrolysate in an amount of about 3.0% to about 30%,
    a whipping agent in an amount of about 0.1 to about 7.5%,
    a thickening agent in an amount of up to about 3%,
    cellulosics in an amount up to about 10%, and
    water in an amount of about 1% to about 7%; and (2) a syrup component comprising;
    a hydrogenated starch hydrolysate in an amount of about 19.5% to about 86%, a sugar alcohol in an amount of up to about 45%, cellulosics in an amount of about 10%, and water in an amount of about 0.75% to about 0.5%, (3) fat in an amount of about 2% to about 10%

(4) a material selected from colorants, flavorants, preservatives, sweeteners, graining agent and mixtures thereof, wherein the cellulosics are a non-water soluble cellulosic and a water soluble cellulosic such that the total amount of cellulosics in the composition is about 1% to about 10% and the ratio of water soluble to non-water soluble cellulosics in the total composition is about 1:3 to about 3:1, and wherein the total amount of hydrogenated starch hydrolysate in the composition is about 35% to about 89%;

all percents herein are by weight of the final composition.

While the invention is not to be limited to theoretical considerations, it is believed that incorporation of the cellulosics reduce the inherent excessive cold flow and stickiness associated with hydrogenated starch hydrolysate confection by occupying surface space, building body to the final piece and sorbing moisture.

In forming the confectionery product of the invention, the product may contain from about 35% to about 89%, and preferably from about 50% to about 80% and most preferably from about 65% to about 70% of a hydrogenated starch hydrolysate.

A total hydrogenated starch hydrolysate content of less than about 35% results in a product with a dry, tough chew. Hydrogenated starch hydrolysate content greater than about 89% results in a sticky wet product having excessive cold flow.

In practice, the hydrogenated starch hydrolysate is employed in both the frappe component and the syrup component. The syrup component may contain from about 19.5% to about 86%, preferably about 42% to about 84% and most preferably about 55% to about 82% hydrogenated starch hydrolysate. The frappe component may contain from about 3% to about 30%, preferably about 4.5% to about 26%, and most preferably about 5.5% to about 23% hydrogenated starch hydrolysate. All percents are by weight of the total composition.

The hydrogenated starch hydrolysates employed herein may include those disclosed in reissue U.S. Pat. Nos. Re. 25,959, 3,356,811, 4,279,931 and various hydrogenated glucose syrups and/or powders which contain sorbitol, hydrogenated disaccharides, hydrogenated tri to hexasaccharides, and hydrogenated higher polysaccharides, or mixtures of any two or more of the above.

Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides gives different hydrogenated starch hydrolysates different properties. The degree of polymerization (DP) of various hydrogenated starch chydrolysates are presented in Table 1.

Products high in percentages of monomer (DP1) and dimer (DP2) will have higher sweetness levels and produce softer confectionery products, while products high in percentages of polymers will have low sweetness and produce confectionery products that have a hard texture. DP-1 for example could stand for sorbitol, mannitol, xylitol or any other hydrogenated monosaccharide. DP-1 is generally sorbitol due to the natural abundance of glucose in the corn syrup starting material. Similarly, the percent DP-2 defines the amount of hydrogenated disaccharides such as maltitol present while DP-3, DP-4, DP-5 . . . and so on define the amounts of higher hydrogenated saccharides present in the hydrogenated starch hydrolysate.

Preferably, the hydrogenated starch hydrolysate will have a DP-1 value of about 5% to about 10% and, a DP-2 of about 15% to about 65% and a DP-3 and higher content of about 30% to about 70%.

TABLE 1

Degree of Polymerization (DP) Values For Typical Hydrogenated Starch Hydrolysates.

|  | Dp-1 | DP-2 | DP-3 | DP-4+ | DP3–DP6 | DP6+ | DP-3+ |
|---|---|---|---|---|---|---|---|
| Lycasin[1] | 6–8 | 50–55 | N.D.[3] | N.D. | 20–25 | 15–20 | 35–45 |
| Hystar[2] HM-75 | 15 | 50 | 12 | 23 |  |  | 35 |
| Hystar 3375 | 14 | 18 | 10 | 58 |  |  | 68 |
| Hystar 4075 | 13 | 23 | 12 | 49 |  |  | 51 |
| Hystar 5875 | 7 | 60 | 11 | 22 |  |  | 33 |
| Hystar 6075 | 14 | 8 | 10 | 68 |  |  | 78 |

[1]Lycasin is a trademark of Roquette Corporation
[2]Hystar is a trademark of Lonza, Inc.
[3]ND = Not Determined The frappe component comprises by weight of the confectionery composition at least one whipping agent present in an amount of from about 0.1% to about 7.5%. The whipping agent functions as a means of holding air introduced into the product to produce a uniform dispersity of air cells within the confection leading to a lower specific gravity and considerable modification to the texture.

Suitable sugarless whipping agents may include egg albumin, gelatin, vegetable proteins such as soy derived compounds, sugarless milk derived compounds such as milk proteins and modified milk proteins, and mixtures thereof.

In a preferred embodiment, the frappe comprises, by weight of the confectionery product at least one whipping agent present in an amount of from about 0.5% to about 5% and most preferably 0.5% to about 3%.

The frappe may comprise a thickening agent in an amount of up to about 3% by weight of the confectionery composition. The thickening agent adds viscosity to the frappe mixture before whipping. A thickening agent content of greater than 3% will produce a frappe mixture that is too viscous to whip. Preferably, the frappe thickening agent will be present in an amount of about 0.1% to about 1%. In the preferred range, the frappe thickening agent will add sufficient viscosity to the frappe component so that air entrapment will be enhanced during the whipping process. The frappe thickening agent has an additional smoothing effect on the confectionery composition thereby improving mouthfeel.

Preferred thickening agents are hydrocolloids, more commonly referred to as "gums." Hydrocolloids are long-chain, high-molecular weight polymers that disperse in water to give a thickening and sometimes a gelling effect. Both natural and synthetic hydrocolloids are useful in the present invention. Natural gums are derived from various plant and animal sources. Illustrative, non-limiting examples of natural hydrocolloids suitable for use in the present invention include plant exudates such as arabic, tragacanth, karaya, ghatti; seaweed extracts such as agar, alginates, carrageenans, furcellaran; plant seed gums such as guar, locust bean, psyllium, quince, tamarind; non fermentable cereal gums such as corn hull gum; plant extracts such as pectin, arabinogalactan; and fermentation gums such as dextran, xanthan and curdlan. Synthetic hydrocolloids or synthetic gums are gum-like chemically synthesized polmers having no structural relationships to natural gums. Illustrative non-limiting examples of synthetic hydrocolloids suitable for food include polyvinylpyrrolidone, carboxyvinyl polymers, and polyethylene oxide polymers.

Thickening agents may be used individually or in mixtures.

The frappe further comprises water in an amount of about 1% to about 7%, preferably about 1.4% to about 6% by weight of the total composition.

The confectionery composition further comprises cellulosics. The cellulosics may be incorporated entirely in the frappe component, entirely in the syrup component, partially in each component or into the nougat formed after blending the frappe and syrup. The cellulosics are present in an amount of about 1% to about 10% of water soluble and non-water soluble cellulosics present in a ratio of about 1:3 to about 3:1. Preferably the cellulosics are present in an amount of about 2% to about 9% and most preferably about 4% to about 7%. Preferably, the water soluble and non-water soluble cellulosics are present in a ratio of about 1:2 to about 2:1 and most preferably are present in a ratio of about 1:1. In a preferred embodiment, the cellulosics are incorporated into the frappe component.

If the ratio of water soluble to water non-soluble cellulosics is greater than 3:1 the resulting product has a rough mouthfeel. A ratio less than 1:3 will result in a product having an astringent mouthfeel.

The term cellulosics is used in the specification and claims are defined to include the compounds known as cellulose and modified cellulose.

Cellulose is a constituent of almost every food from the plant kingdom. These crude celluloses are impure, they contain much hemicellulose, lignin, ash and solvent soluble components. Food grade cellulose is made by the controlled hydrolysis of crude cellulose. The amorphous regions are hydrolyzed, leaving the crystalline areas intact in the form of tiny rod like microcrystals. Cellulose is a non-nutritive dietary fiber chemically defined as beta-1,4-glucan. It is fibrous in form. The fibers may vary in width from about 0.005 to 0.35 mm, and in length from about 0.001 to 4 mm. Cellulose is not water soluble. This substance can be added to foods to contribute bulk without calories or form a creamy colloidal suspension which also modifies texture. When used in large amounts, however, it imparts a dry chalky mouthfeel.

Modified celluloses also called cellulose gums are prepared from purified cellulose by first swelling the cellulose fibers with sodium hydroxide and then by chemically substituting exposed hydroxyl groups. Through this process, a variety of substituted celluloses have been prepared which are soluble in water and are capable of gellation.

This substance can be added to foods to contribute bulk without calories to form a gel structure within the food and to modify the texture and mouthfeel.

Water nonsoluble cellulose, beta 1,4 glucan, suitable for use in the present invention is also known as: powdered cellulose, purified cellulose, microcrystalline cellulose, and alpha cellulose.

Water soluble modified cellulose suitable for use in the present invention include methylcellulose, hydroxypropylmethylcellulose, carboxymethylcellulose, hydroxypropylcellulose, methylethylcellulose, hydroxyethylcellulose and mixtures thereof. A preferred modified cellulose is hydroxypropyl methylcellulose.

It is critical that the cellulose of the present invention have a fiber length that will not cause a gritty character to the nougat. Preferably the cellulose will have an average maximum fiber length of less than about 40 microns and most preferably an average maximum fiber length of less than about 20 microns.

The syrup component of the present invention comprises by weight of the confectionery composition, hydrogenated starch hydrolysate in an amount of about 19.5% to about 86%, up to about 45% of a sugar alcohol, cellulosics in an amount up to about 10% and a final water content of about 0.75% to about 5%.

In a preferred embodiment, the syrup component comprises by weight of the confectionery composition, from about 42% to about 84% of a hydrogenated starch hydrolysate, about 3% to about 6% of a sugar alcohol, about 3% to about 6% of cellulosics and a final water content of about 0.75% to about 5%.

The sugarless confectionery composition in addition to the foregoing materials comprises fat in an amount of about 2% to about 10% and preferably about 4% to about 8%.

A fat content of less than about 2% results in a product with a sticky tough chew. A fat content of more than about 10% results in a product having a fatty, waxy chew and greasy feel.

The sugarless confectionery composition of the present invention may also comprise a sugar alcohol. The sugar alcohol when present will increase the sweetness of the confection and aid graining of the composition. Illustrative, non-limiting examples of sugar alcohols suitable for use in the present invention include: mannitol, xylitol, sorbitol, galactitol, lactitol, maltitol and mixtures thereof. The sugar alcohols when present are used in amounts up to about 45%, and preferably from about 2% to about 10%. The sugar alcohols may be incorporated entirely in the frappe component, syrup component or both.

A graining compound or agent may also be optionally employed to promote faster setting times for the final product.

The graining compound promotes faster setting times by "seeding" crystalline growth. This provides for fast crystallization forming smaller crystals resulting in soft chew product. Preferred graining agents are crystalline sugar alcohols. Illustrative, non-limiting examples of sugar alcohols useful in the present invention include: mannitol, xylitol, sorbitol, galactitol, lactitol, maltitol and mixtures thereof. The graining compound, when used, is present in an amount from about 0.5% to about 4.0% by weight.

A preferred graining compound is mannitol.

The sugarless confectionery composition may include further additives utilized conventionally to prepare nougat products. Thus the present soft, sugarless, confectionery composition may include materials selected from pigments, colorants, oils, graining agents, preservatives, flavorings sweeteners and so forth, and mixtures of these in varying amounts.

In the instance where auxiliary sweeteners are utilized, the present invention contemplates the inclusion of those sugarless sweeteners well known in the art.

Thus, additional sweeteners may be chosen from the following non-limiting list:

Water-soluble artificial sweeteners such as the soluble saccharin salts, i.e., sodium, or calcium saccharin salts, cyclamate salts, acesulfame-K and the like, and the free acid form of saccharin.

Dipeptide based sweeteners such as L-aspartyl-L-phenylalanine methyl ester and materials described in U.S. Pat. No. 3,492,131 and the like.

In general, the amount of sweetener will vary with the desired. This amount will normally be 0.001% to about 5% by weight. The artificial sweeteners described above are preferably used in amounts of about 0.005% to about 5.0% and most preferably about 0.05% to about 2.5% by weight of the final composition.

Those materials incorporated and desirable to aid in the final processing of the soft, sugarless chewable nougat based product include fats, oils, preservatives, colorants and flavorings. Suitable fats and oils include fractionated fat, hydrogenated oils, partially hydrogenated oils, unsaturated oils, coconut oil, palm oil, palm kernel oil, cottonseed oil, safflower oil, sunflower oil, soy oil, corn oil and mixtures thereof. The term "fats" and "oils" are used interchangeably, although there may be differences as understood by the skilled artisan. "Fats" is generally a term to refer to the solid embodiment of the above-mentioned groups and "oils" refers to the liquid form.

Suitable flavorings include natural and artificial flavors such as mints, peppermint, artificial vanilla, natural vanilla, cinnamon, various fruit flavors, both individual and mixed. Flavorings include compounds which modify taste perception. Particularly useful tast modifiers include the food acids. Suitable food acids include citric acid, fumaric acid, malic acid, ascorbic acid, tartaric acid, lactic acid, sorbic acid and mixtures thereof. The flavorings are generally utilized in amounts that will vary depending upon the individual flavor and may, for example range up to 2% by weight or higher.

The colorants useful in the present invention, include the pigments which may be incorporated in amounts of up to about 6% by weight of the composition. A preferred pigment, titanium dioxide, may be incorporated in amounts of up to about 1% by weight. Also, the colorants may include other dyes suitable for food, drug and cosmetic applications, and known as F.D. & C. dyes and the like. The materials acceptable for the foregoing spectrum of use are preferably water-soluble. Illustrative examples include the indigo dye, known as F.D. & C. Blue No. 2, which is the disodium salt of 5,5-indigotindisulfonic acid. Similarly, the dye known as F.D. & C. Green No. 1, comprises a triphenylmethane dye and is the monosodium salt of 4-[4-Nethyl-p-sulfobenzylamino)diphenylmethylene]-[1(N-ethyl-N-psulfonium-benzyl)-2,5-cyclohexadieni-mine]. A full recitation of all F.D. & C. and D. % C. colorants and their corresponding chemical structures may be found in the Kirk-Othmer Encyclopedia of Chemical Technology, 3rd Edition, in Volume 6, at pages 561–595, which text is accordingly incorporated herein by reference.

The composition may additionally comprise a second thickening agent as a texture modifying ingredient to enchance mouthfeel in an amount of about 0.2% to about 2.5%, preferably in an amount of about 0.5% to about 1.5%. This second thickening agent is comprised of the same materials as the thickening agent of the frappe component and is added to the syrup and frappe mixture. The total thickening agent content of the composition is up to about 5.5% by weight.

The frappe is prepared by mixing the whipping agent with the other components of the frappe to form an aerated sponge like mass.

The syrup component is prepared by initially mixing the hydrogenated starch hydrolysate with the other components of the syrup and an amount of water to assure solution of the water soluble ingredients. The total water content is not critical, however, it is preferably to keep the initial water content below about 40% by weight of the syrup component. This mixture is charged into a suitable cooker and cooked to a final water content of about 0.75% to about 5% by weight of the total composition or to a temperature of about 155° C. to about 185° C. The syrup component is then cooled from about 110° C. to about 145° C.

Once the above steps are complete, the frappe component and the syrup component may be combined, usually by the addition of syrup component to the frappe component after the syrup component's temperature has dropped to about 110° C. to about 145° C. The resultant combination is then mixed. If colorants are to be incorporated, they may be incorporated at this point. The composition is then mixed until a uniform homogenous mass is formed. Fats are then incorporated into the composition at this time. The above composition is mixed until the temperature of the composition is less than about 90° C. but greater than about 60° C. At this point, the graining compound, if employed, is added to the composition. If flavorings are to be incorporated, they may be added into the confection also at this time. The mixture is then further mixed until uniform.

Once all of the ingredients have been blended into the mixture, the mixture is allowed to cool. The mixture may be cooled to ambient temperatures before final forming operations are completed.

A variety of final forming techniques may be utilized, depending upon the shape and size of the final product as desired.

Once prepared the final composition may be processed into any desirable shape or form. Exemplary, nonlimiting shapes include squares, rectangles, spheres, tabloids and biconvex shapes. Other suitable shapes may also be employed.

In a preferred procedure, the frappe is prepared by mixing the whipping agent with the hydrogenated starch hydrolysate, the thickening agent, the cellulosics and water at ambient temperature to form an aerated sponge like mass.

The present invention is further illustrated by the following examples. All parts and percentages in the examples and throughout the specification and claims are by weight of the final composition unless otherwise indicated.

The following general procedure was used to prepare the confectionery compositions of Examples 1 and 2.

Preparation of frappe

Dissolve the thickening agent in about 25 ml of cold water, about 20° C., mix for about 10 minutes until free of lumps.

Place the Lycasin ® (Roquette Corp) in a Hobart bowl then add the cellulosics. Fold the cellulosics into the Lycasin ® to form a smooth paste.

Dissolve the whipping agent in about 75 ml of hot water, about 60° C., stirring until fully hydrated.

Combine the hydrated whipping agent with the thickening agent paste and mix together until uniform.

Add the whipping agent/thickening agent mixture to the bowl containing the paste of Lycasin ® and cellulosics and whip the mixture with a wire wisk at high speed for about 5 minutes or until a density of about 0.3 to about 0.8 grams/cc is obtained. Store for later use.

Preparation of the syrup

To a stainless steel pot add the Lycasin ® and polyol. Cook to a temperature of about 165° C. Cool to about 145° C. before further use.

Preparation of the Nougat-type aerated confection

To a Hobart bowl add the frappe. Pour into this frappe the cooked syrup having a temperature of about 145° C. and beat with a leaf blade for about 5 minutes at low speed. After about 5 minutes, beat on about 5 minutes at moderate speed.

While beating at low speed, add the melted fat, flavorant (5), graining agent, color and mix until uniform about 7 minutes.

Add the thickening agent solution (if applicable) and mix at low speed for about 2 minutes.

Recover, cut shape, and wrap the product.

EXAMPLE 1

(Inventive Run A)

This Example demonstrates the formation of a product of this invention having the following composition.

| Ingredient | Percent by Weight |
|---|---|
| Frappe | 23.0 |
| Gum Arabic Powder USP | 0.5 |
| Egg White Solids Type P-20 | 1.1 |
| Hydrogenated Starch Hydrolysate (Lycasin ® 80/50, Roquette Corp) | 14.2 |
| Hydroxypropylmethyl cellulose | 1.8 |
| Alpha Cellulose (17 micron average fiber length) | 1.8 |
| Water | 3.6 |
| Syrup | 66.7 |
| Hydrogenated Starch Hydrolysate (Lycasin ® 80/50; Roquette Corp) | 61.7 |
| Mannitol U.S.P. | 3.6 |
| Residual Moisture | 1.4 |
| Thickening Agent Solution (Xanthan Gum) | 1.1 |
| Colorant Solution | 0.1 |
| Fat | 5.9 |
| Flavorant | 0.2 |
| Graining Agent (Mannitol) | 2.0 |
| Citric Acid USP Anhydrous (Flavorant) | 1.0 |
| Total | 100.0 |

The product is a soft nougat-type of confection with an acceptable amount of cold flow and a smooth mouth feel.

EXAMPLE 2

(Inventive Run B)

This Example demonstrates the formation of a product of this invention having the following composition.

| Ingredient | Percent by weight |
|---|---|
| Frappe | 23.0 |
| Gum Arabic Powder U.S.P. | 0.5 |
| Gelatin 150 bloom | 1.1 |
| Hydrogenated Starch Hydrolysate (Lycasin ® 80/50 Roquette Corp.) | 14.2 |
| Hydroxypropylmethylcellulose | 1.8 |
| Alpha Cellulose (17 micron Average Fiber Length) | 1.8 |
| Water | 3.6 |
| Syrup | 68.4 |
| Hydrogenated Starch Hydrolysate (Lycasin ® 80/50 Roquette Corp) | 63.3 |
| Mannitol U.S.P. | 3.7 |
| Residual Moisture | 1.4 |
| Thickening Agent Solution (Xanthan Gum) | — |
| Colorant Solution | 0.1 |
| Fat | 5.2 |
| Flavorant | 0.3 |
| Graining Agent (mannitol) | 2.0 |
| Citric Acid U.S.P. Anhydrous (Flavorant) | 1.0 |
| Total | 100.0 |

The product is a soft nougat-type of confection with a acceptable amount of cold flow and a smooth mouth feel.

The following general procedure was used to prepare the comparative confectionery compositions of Examples 3 and 4.

Preparation of frappe

Dissolve the th%ckening agent in about 25 ml of cold water, about 20° C., mix for about 10 minutes until free of lumps.

Place the Lycasin ® (Roquette Corp) in a Hobart bowl then add the cellulosics. Fold the cellulosics into the Lycasin ® to form a smooth paste.

Dissolve the whipping agent in about 75 ml of hot water, about 60° C., stirring until fully hydrated.

Combine the hydrated whipping agent with the thickening agent paste Example 4 add 20 ml of water) and mix together until uniform.

Add the whipping agent/thickening agent mixture to the bowl containing the paste of Lycasin ® and cellulosics and whip the mixture with a wire wisk at high speed for about 5 minutes or until a density of about 0.7 to about 0.8 grams/cc is obtained. Store for later use.

Preparation of the syrup

To a stainless steel pot add the Lycasin ® and polyol. Cook to a temperature of about 165° C. Cool to about 140° C. before further use.

Preparation of the Nougat-type aerated confection

To a Hobard bowl add the frappe. Pour into this frappe the cooked syrup having a temperature of about 140° C. and beat with leaf blade for about 10 minutes at moderate speed.

While beating at low speed, add the melted fat, flavorant (5), graining agent, color and mix until uniform about 2 minutes.

Recover, cut, shape, and wrap the product.

EXAMPLE 3

(Comparative Run)

This Example demonstrates the formation of a comparative product utilizing only water non-soluble cellulose. The product has the following composition.

| Ingredient | Percent by weight |
| --- | --- |
| Frappe | 23.0 |
| Gum Arabic Powder U.S.P. | 0.5 |
| Gelatin 150 bloom | 1.1 |
| Hydrogenated Starch Hydrolysate (Lycasin ® 80/50 Roquette Corp.) | 14.2 |
| Hydroxypropylmethylcellulose | — |
| Alpha Cellulose (17 micron fiber length) | 3.6 |
| Water | 3.6 |
| Syrup | 68.4 |
| Hydrogenated Starch Hydrolysate (Lycasin ® 80/50 Roquette Corp.) | 63.3 |
| Mannitol U.S.P. | 3.7 |
| Residual Moisture | 1.4 |
| Thickening Agent Solution (Xanthan Gum) | — |
| Colorant Solution | 0.1 |
| Fat | 5.2 |
| Flavorant | 0.3 |
| Graining Agent (mannitol) | 2.0 |
| Citric Acid U.S.P. Anhydrous | 1.0 |
| Total | 100.0 |

The product is a soft nogat-type of confection with an accpetable amount of cold flow and an unacceptable astringent mouthfeel.

EXAMPLE 4

(Comparative Run 1)

This Example demonstrates the formation of a comparative product utilizing only water soluble cellulose. The product has the following composition.

| Ingredient | Percent by weight |
| --- | --- |
| Frappe | 23.0 |
| Gum Arabic Powder U.S.P. | 0.5 |
| Gelatin 150 bloom | 1.1 |
| Hydrogenated Starch Hydrolysate (Lycasin ® 80/50 Roquette Corp.) | 14.2 |
| Hydroxypropylmethylcellulose | 3.6 |
| Alpha Cellulose (17 micron fiber length) | — |
| Water | 3.6 |
| Syrup | 68.4 |
| Hydrogenated Starch Hydrolysate (Lycasin ® 80/50 Roquette Corp.) | 63.3 |
| Mannitol U.S.P. | 3.7 |
| Residual moisture | 1.4 |
| Thickening Agent Solution (Xanthan Gum) | — |
| Colorant Solution | |
| Fat | 0.1 |
| Flavorant | 5.2 |
| Graining Agent (Mannitol) | 0.3 |
| Citric Acid U.S.P. Anhydrous | 1.0 |
| Total | 100.0 |

The product is a soft nougat-type of confection with an acceptable amount of cold flow and an unacceptable rough mouthfeel.

The following procedure was used to prepare the confectionery composition of Example 5.

Preparation of frappe

Dissolve the thickening agent in about 25 ml of cold water, about 20° C., mix for about 10 minutes until free of lumps.

Place the Lycasin ® (Roquette Corp.) in a Hobart bowl then add the cellulosics. Fold the cellulosics into the Lycasin ® to form a smooth paste.

Dissolve the whipping agent in about 75 ml of hot water, about 60° C., stirring until fully hydrated.

Combine the hydrated whipping agent with he thickening agent paste and mix together until uniform.

Add the whipping agent/thickening agent mixture to the bowl containing the paste of Lycasin ® and cellulosics and whip the mixture with a wire wisk at high speed for about 5 minutes or until a density of about 0.7 to about 0.8 grams/cc is obtained. Store for later use.

Preparation of the syrup

To a stainless steel pot add the Lycasin ® and polyol. Cook to a temperature of about 180° C. before further use.

Preparation of the Nougat-type aerated confection

To a Hobart bowl add the frappe. Pour into this frappe the cooked syrup having a temperature of about 130° C. and beat with a leaf blade for about 5 minutes at low speed.

While beating at low speed, add the melted fat, flavorant (5), graining agent, color and mix until uniform about 7 minutes.

Add the thickening agent solution and mix at low speed for about 2 minutes.

Recover, cut, shape, and wrap the product.

EXAMPLE 5

(Inventive Run C)

This Example demonstrates the formation of a product of this only water non-soluble cellulose invention having the following composition.

| Ingredients | Percent by weight |
| --- | --- |
| Frappe | 20.3 |
| Gum Arabic Powder U.S.P. | 0.5 |
| Egg White Solids Type P-20 | 0.9 |
| Hydrogenated Starch Hydrolysate (Lycasin ® 80/50 Roquette Corp.) | 12.6 |
| Hydroxypropylmethylcellulose | 1.6 |
| Alpha Cellulose (17 micron fiber length) | 1.6 |
| Water | 3.1 |
| Syrup | 79.7 |
| Hydrogenated Starch Hydrolysate (Lycasin ® 80/50 Roquette Corp.) | 48.8 |
| Mannitol U.S.P. | 15.6 |
| Residual moisture | 0.6 |
| Thickening Agent Solution (Xanthan Gum) | 1.2 |
| Colorant Solution | — |
| Fat | 8.0 |
| Flavorant | 0.3 |
| Graining Agent (mannitol) | 4.1 |
| Citric Acid U.S.P. Anhydrous | 1.1 |
| Total | 100.0 |

The product is a soft nougat-type of confection with no cold flow and a smooth mouthfeel.

The invention being thus described, it will be obvious that the same may be varied in many ways. Such variations are not to be regarded as departure from the spirit and scope of the invention and all such modifications are intended to be included within the scope of the following claims.

What is claimed is:

1. A sugarless chewable aerated confectionery composition which comprises: a hydrogenated starch hydrolysate in an amount of about 35% to about 89%, cellulosics in an amount of about 1% to about 10% wherein the cellulosics are a non-water soluble and a water soluble cellulosic such that the ratio of water soluble to non water soluble cellulosic is about 1:3 to about 3:1, a whipping agent in an amount of about 0.1% to about 7.5%, fat in an amount of about 2% to about 10%, and a final water content of about 7% to about 12%.

2. The composition of claim 1 wherein the water soluble cellulosic is selected from the group consisting of: methylethylcellulose, Hydroxypropylmethylcellulose, carboxymethylcellulose, hydroxypropylcellulose, methylcellulose, hydroxyethylcellulose and mixtures thereof and the non-water soluble cellulosic is selected from the group consisting of: powdered cellulose, purified cellulose, microcrystalline cellulose, alpha cellulose and mixtures thereof.

3. The composition of claim 1 wherein the hydrogenated starch hydrolysate has a DP-1 content of about 5% to about 15%, a DP-2 content of about 15% to about 65%, and DP-3 and higher content of about 30% to about 70%.

4. The composition of claim 1 wherein the whipping agent is selected from the group consisting of egg albumen, gelatin, vegetable proteins such as soy derived compounds, sugarless milk derived compounds such as milk proteins and modified milk proteins and mixtures there of.

5. The compositions of claim 1 wherein the fat is selected from the group consisting of: fractionated fat, Hydrogenated oils, partially Hydrogenated oil, unsaturated oils, coconut oil, palm oil, palm kernel oil, cottonseed oil, safflower oil, sunflower oil, soy oil, corn oil and mixtures thereof.

6. The composition of claim 1 further comprising a thickening agent to increase viscosity and improve mouthfeel in an amount up to about 5.5% wherein said thickening agent is selected from the group consisting of natural and synthetic hydrocolloids and mixtures thereof.

7. The composition of claim 6 wherein said thickening agent is a natural hydrocolloid selected from the group consisting of plant exudates such as arabic, tragacanth, karaya, ghatti; seaweed extracts agar, alginates, carrageenans, furcellaran; plant seed gums such as guar, Locust bean, psyllium, quince, Tamarind; non-fermentable cereal gums such as corn hull gum; plant extracts such as pectin, arabinogalactan; fermentation gums such as dextran, xanthan and curdlan, and mixtures thereof.

8. The composition of claim 6 wherein said thickening agent is a synthetic hydrocolloid selected from the group consisting of polyvinylpyrrolidone, carboxyvinyl polymers, polyethylene oxide polymers and mixtures thereof.

9. The composition of claim 1 further comprising a sugar alcohol in an amount up to about 45%.

10. The composition of claim 9 wherein the sugar alcohol is selected from the group consisting of mannitol, xylitol, sorbitol, galactitol, lactitol, maltitol and mixture thereof.

11. The composition of claim 1 wherein the cellulosics have an average maximum fiber length of about 40 microns.

12. A sugarless chewable aerated confectionery composition which comprises:
 (1) from about 10% to about 35% of a frappe component comprising;
  a hydrogenated starch hydrolysate in an amount of about 3% to about 30%,
  a whipping agent in an amount of about 0.1% to about 7.5%,
  1%, cellulosics in an amount up to about 10%, and water in an amount of about 0.75% to about 5%; and
 (2) a syrup component comprising;
  a hydrogenated starch hydrolysate in an amount of about 19.5% to about 86%,
  cellulosics in an amount up to about 10%, and water in an amount of about 0.75% to about 5%,
 (3) fat in an amount of about 2% to about 10%
  wherein the cellulosics are a non-water soluble cellulosic and a water soluble cellulosic such that the total amount of cellulosics in the composition is about 1% to about 10% and the ratio of water soluble to non-water soluble in the total composition is about 1:3 to about 3:1, and
  wherein the total amount of hydrogenated starch hydrolysate in the composition is about 35% to about 89%; percents herein are by weight of the final composition.

13. The composition of claim 1 further comprising one or more materials selected from colorants, graining agents flavorants, sweeteners, and preservatives.

14. The composition of claim 12 which further comprises a thickening agent wherein said thickening agent is present in an amount of up to about 5.5%.

15. The composition of claim 14 wherein said thickening agent is a natural hydrocolloid selected from the group consisting of plant exudates such as arabic, tragacanth, karaya, ghatti; seaweed extracts such as agar, alginates, carrageenans, furcellaran; plant seed gums such as %uar, locust bean, psyllium, quince, tamarind; non-fermentable cereal gums such as corn hull gum; plant extracts such as pectin, arabinogalactan; fermentation gums such as dextran, xanthan and curdlan, and mixtures thereof.

16. The composition of claim 14 wherein said thickening agent is a synthetic hydrocolloid selected from the group consisting of polyvinylpyrrolidone, carboxyvinyl polymers, polyethylene oxide polymers and mixtures thereof.

17. The composition of claim 12 further comprising a sugar alcohol in an amount up to about 45%.

18. The composition of claim 17 wherein the sugar alcohol is selected from the group consisting of: mannitol, xylitol, sorbitol, galactitol, lactitol, maltitol and mixtures thereof.

19. The composition of claim 12 wherein the cellulosics have an average maximum fiber length of about 40 microns.

20. The composition of claim 12 wherein the water soluble cellulosics are selected from the group consisting of methylcellulose, hydroxpropylmethylcellulose, carboxymethylcellulose, hydroxpropylcellulose, methylethylcellulose, hydroxyethylcellulose and mixtures thereof and the non-water soluble cellulosic is selected from the group consisting of: powdered cellulose, purifies cellulose, microcrystalline cellulose, alpha cellulose and mixtures thereof.

21. The composition of claim 12 wherein the hydrogenated starch hydrolysate has a DP-1 content of about 5% to about 15%, a DP-2 content of about 15% to about 65%, and a DP-3 and higher content of about 30% to about 70%.

22. The composition of claim 12 wherein the whipping agent is selected from the group consisting of egg, albumen, gelatin, vegetable proteins such as soy derived compounds, sugarless milk derived compounds such as milk proteins and modified milk proteins and mixtures thereof.

23. The composition of claim 12 wherein the fat is selected from the group consisting of: fractionated fat, hydrogenated oils, partially hydrogenated oils, unsaturated oils, coconut oil, palm oil, palm kernel oil, cottonseed oil, safflower oil, sunflower oil, soy oil, corn oil and mixtures thereof.

24. A method for preparing a sugarless aerated confectionery composition which comprises
   (a) Preparing a syrup component by admixing a hydrogenate starch hydrolysate in an amount of about 19.5% to about 86%, cellulosics up to about 10% and water, heating said admixture to a temperature of about 155° C. to about 185° C.
   (b) preparing a frappe component by admixing at least one whipping agent which introduces air into the confectionery composition in an amount of about 0.1% to about 7.5%, cellulosics in an amount up to about 10%, a hydrogenated starch hydrolysate in an amount of about 3% to about 30%.
   (c) slowly adding said syrup component under agitation and at an elevated temperature of from about 110° C. to about 145° C. to said frappe component,
   (d) mixing said frappe component and said syrup component to form a uniform mixture,
   (e) admixing fat with the mixture of step (d) to form a uniform mixture,
   (f) forming said mixture into the confectionery product,
   wherein the cellulosics are a non-water soluble cellulosics such that the total amount of cellulosics in the composition is about 1% to about 10% and the ratio of water soluble to non-water soluble in the total composition is about 1:3 to about 3:1, and
   wherein the total amount of hydrogenated starch hydrolysate in the composition is about 35% to about 89%; percents herein are by weight of the final composition.

25. The method of claim 24 wherein, during the mixing of step (d), there is added to said step (d), mixture one or more materials selected from colorants, flavorants, sweeteners preservatives, thickening agents and sugar alcohols.

26. The method of claim 24 wherein during the mixing of step (b), there is added a thickening agent in an amount of about 0.1% to about 1%.

27. The method of claim 24 wherein the cellulosics are added to the frappe component in an amount of about 1% to about 10%.

28. The method of claim 24 wherein the water soluble cellulosic is selected from the group consisting of: methylcellulose, hydroxpropylcellulose, methylethylcellulose, hydroxyethylcellulose and mixtures thereof and the non-water soluble cellulosics is selected from the group consisting of: powdered cellulose, purified cellulose, microcrystalline cellulose and mixtures thereof.

29. The method of claim 24 wherein the hydrogenated starch hydrolysate has a DP-1 content of about 5% to about 15%, a DP-2 content of about 15% to about 65%, and a DP-3 and higher content of about 30% to about 70%.

30. The method of claim 24 wherein the whipping agent is selected from the group consisting of egg albumen, gelatin, vegetable proteins such as soy derived compounds, sugarless milk derived compounds such as milk proteins and modified milk proteins and mixtures thereof.

31. The method of claim 24 wherein the fat is selected from the group consisting of: fractionated fat, Hydrogenated oils, partially Hydrogenated oils, unsaturated oils, coconut oil, palm oil, palm kernel oil, cottonseed oil, safflower oil, sunflower oil, soy oil, corn oil and mixtures thereof.

32. The method of claim 24 further comprising a thickening agent to increase viscosity and improve mouthfeel in an amount up to about 5.5% wherein said thickening agent is selected from the group consisting of natural and synthetic hydrocolloids and mixtures thereof.

33. The method of claim 32 wherein said thickening agent is a natural hydrocolloid selected from the group consisting of plant exudates such as arabic, tragacanth, karaya, ghatti; seaweed extracts such as agar, alginates, carrageenans, furcellaran; plant seed gums such as guar, locust bean, psyllium, quince, tamarind; non-fermentable cereal gums such as corn hull gum; plan extracts such as pectin, arabinogalactan; fermentation gums such as dextran, xanthan and curdlan, and mixtures thereof.

34. The composition of claim 32 wherein said thickening agent is a synthetic hydrocolloid selected from the group consisting of polyvinylpyrrolidone, carboxyvinyl polymers, polyethylene oxide polymers and mixtures thereof.

35. The method of claim 24 further comprising a sugar alcohol in an amount up to about 45%.

36. The method of claim 35 wherein the sugar alcohol is selected from the group consisting of mannitol, xylitol, sorbitol, galactitol, Lactitol, maltitol and mixtures thereof.

37. The method of claim 24 wherein the cellulosics have an average maximum fiber length of about 40 microns.

* * * * *

UNITED STATES PATENT AND TRADEMARK OFFICE
CERTIFICATE OF CORRECTION

PATENT NO. : 4,714,620

DATED : December 22, 1987

INVENTOR(S) : Frank J. Bunick et al

It is certified that error appears in the above-identified patent and that said Letters Patent is hereby corrected as shown below:

Claim 12, line 9 thereof, delete "1%,".

Claim 12, line 16 thereof, "0.75% to about 5% should read --1% to about 7%--.

Claim 15, line 6 thereof, "%uar" should read --guar--.

Claim 20, line 3 thereof, "hydroxpropylmethylcellulose" should read --hydroxypropylmethylcellulose--.

Claim 20, line 4 thereof, "hydroxpropylcellulose" should read --hydroxypropylcellulose--.

Claim 20, lines 7 and 8 thereof, "purifies" should read --purified--.

Claim 25, line 4 thereof, after the word "sweeteners" insert --,--.

Claim 28, line 3 thereof, "hydroxpropylcellulose" should read --hydroxypropylcellulose--.

UNITED STATES PATENT AND TRADEMARK OFFICE
CERTIFICATE OF CORRECTION

PATENT NO. : 4,714,620

DATED : December 22, 1987

INVENTOR(S) : Frank J. Bunick et al

It is certified that error appears in the above-identified patent and that said Letters Patent is hereby corrected as shown below:

Claim 33, line 7 thereof, "plan" should read --plant--.

Signed and Sealed this

Eighth Day of August, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,714,620

DATED : December 22, 1987

INVENTOR(S) : Frank Bunick et al.

It is certified that error appears in the above-identified patent and that said Letters Patent is hereby corrected as shown below:

```
Column 14:
    claim 12, line 16 to read "water in an amount of about 0.75% to
about 5%,"

claim 12, line 10 to read "water in an amount of about 1% to about
7%;"
```

Signed and Sealed this

Twelfth Day of April, 1994

*Attest:*

BRUCE LEHMAN

*Attesting Officer*

*Commissioner of Patents and Trademarks*